United States Patent
Yu et al.

(10) Patent No.: US 11,829,030 B2
(45) Date of Patent: Nov. 28, 2023

(54) BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Honghao Yu, Beijing (CN); Lili Jia, Beijing (CN); Donglei Li, Beijing (CN); Ying Chen, Beijing (CN); Hui Liu, Beijing (CN); Jie Gao, Beijing (CN); Jiaxin Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 187 days.

(21) Appl. No.: 17/310,391

(22) PCT Filed: Oct. 16, 2020

(86) PCT No.: PCT/CN2020/121365
§ 371 (c)(1),
(2) Date: Jul. 30, 2021

(87) PCT Pub. No.: WO2022/077411
PCT Pub. Date: Apr. 21, 2022

(65) Prior Publication Data
US 2022/0317517 A1    Oct. 6, 2022

(51) Int. Cl.
*G02F 1/00*       (2006.01)
*G02F 1/13357*    (2006.01)
*G02F 1/1335*     (2006.01)

(52) U.S. Cl.
CPC .. *G02F 1/133605* (2013.01); *G02F 1/133603* (2013.01); *G02F 1/133607* (2021.01)

(58) Field of Classification Search
None
See application file for complete search history.

(56) References Cited

U.S. PATENT DOCUMENTS

| | | | |
|---|---|---|---|
| 10,976,602 B2 | 4/2021 | Zheng et al. | |
| 2018/0023784 A1* | 1/2018 | Tamura | F21V 9/08 362/235 |

(Continued)

FOREIGN PATENT DOCUMENTS

| | | |
|---|---|---|
| CN | 109188781 A | 1/2019 |
| CN | 110727145 A | 1/2020 |

(Continued)

OTHER PUBLICATIONS

Janecek, M. "Reflectivity Spectra for Commonly Used Reflectors." IEEE Transactions on Nuclear Science, vol. 59, No. 3, Jun. 30, 2012, pp. 490-497., https://doi.org/10.1109/tns.2012.2183385 ("Janecek"). (Year: 2012).*

*Primary Examiner* — Gerald J Sufleta, II
(74) *Attorney, Agent, or Firm* — Kinney & Lange, P.A.

(57) ABSTRACT

A backlight module and a display device are provided, and the backlight module includes: a substrate; a plurality of light-emitting elements arranged in an array on the substrate; and a reflective supporting structure on the substrate, wherein the reflective supporting structure has a plurality of openings, the plurality of openings correspond to the plurality of light-emitting elements one-to-one, and each of the plurality of light-emitting elements is accommodated in one of the plurality of openings, wherein the reflective supporting structure is configured to reflect light from the plurality of light-emitting elements, so that an angle between an exit direction of the reflected light and a first direction perpendicular to the substrate is less than a predetermined angle.

15 Claims, 7 Drawing Sheets

(56) References Cited

U.S. PATENT DOCUMENTS

| | | | |
|---|---|---|---|
| 2018/0217449 A1* | 8/2018 | Mifune | G02F 1/133605 |
| 2020/0161516 A1* | 5/2020 | Sasaoka | G02B 5/1876 |
| 2020/0166804 A1* | 5/2020 | Zheng | G02F 1/133608 |
| 2021/0405449 A1 | 12/2021 | Kim et al. | |

FOREIGN PATENT DOCUMENTS

| | | |
|---|---|---|
| CN | 111103723 A | 5/2020 |
| CN | 210514884 U | 5/2020 |
| CN | 211603790 U | 9/2020 |
| WO | 2020184903 A1 | 9/2020 |

\* cited by examiner

Comparative Example 1     Comparative Example 2     Embodiment

FIG. 4

Embodiment　　　Comparative Example 3　　　Comparative Example 4

BACKLIGHT MODULE AND DISPLAY DEVICE

CROSS REFERENCE TO RELATED APPLICATION(S)

This application is a Section 371 National Stage Application of International Application No. PCT/CN2020/121365, filed on Oct. 16, 2020, entitled "BACKLIGHT MODULE AND DISPLAY DEVICE", which is incorporated herein by reference in its entirety.

TECHNICAL FIELD

The present disclosure relates to a field of display technology, and in particular to a backlight module and a display device.

BACKGROUND

In current display industry, liquid crystal display technology based on Mini LED backlight has suddenly emerged. As a transition technology of Micro LED, it may not only make up for many shortcomings of existing liquid crystal display technology, but also has a cost advantage and partial performance advantage of direct competition with OLED in a high-end field, especially in a large size field. Due to a small size of a chip of the Mini LED, it can achieve a better HDR (High Dynamic Range) display effect through higher-precision multi-zone backlight control. However, a large number of LED chips are required. In addition, a field of high-end optical films is monopolized by companies such as 3M, and a cost of the high-end optical films remains high. Therefore, cost reduction and brightness improvement are important factors that enable the Mini LED to be sufficiently competitive in the future display field.

SUMMARY

Some embodiments of the present disclosure provide a backlight module, including: a substrate; a plurality of light-emitting elements arranged in an array on the substrate; and a reflective supporting structure on the substrate, wherein the reflective supporting structure has a plurality of openings, the plurality of openings correspond to the plurality of light-emitting elements one-to-one, and each of the plurality of light-emitting elements is accommodated in one of the plurality of openings, wherein the reflective supporting structure is configured to reflect light from the plurality of light-emitting elements, so that an angle between an exit direction of the reflected light and a first direction perpendicular to the substrate is less than a predetermined angle.

In some embodiments, each of the plurality of openings includes at least one sidewall, and each of the at least one sidewall includes a first side parallel to the substrate and a second side parallel to the substrate, wherein the second side is on a side of the first side away from the substrate, and an orthographic projection of the second side on the substrate is on a side of an orthographic projection of the first side on the substrate away from the light-emitting element.

In some embodiments, each of the plurality of openings includes four sidewalls connected with each other, and each of the four sidewalls is a concave surface.

In some embodiments, the backlight module further includes: a plurality of lens structures covering the plurality of light-emitting elements respectively, wherein the plurality of lens structures correspond to the plurality of light-emitting elements one-to-one, and each of the plurality of lens structures is configured to cause light emitted by a corresponding light-emitting element to exit toward a sidewall of a corresponding opening.

In some embodiments, each of the plurality of lens structures is a convex lens, and a bottom surface of the convex lens has a groove for accommodating the light-emitting element.

In some embodiments, the convex lens has a shape of a spherical cap, a height of the spherical cap is in a range of 0.4 mm to 0.7 mm, and a radius R1 of a sphere to which the spherical cap belongs is in a range of 1 mm to 1.5 mm.

In some embodiments, the sidewall is a concave arc surface, and a radius of curvature R2 of the concave arc surface is $R2=\alpha H$, wherein $\alpha$ is a constant value ranging from 1 to 1.5, and H is a height of the reflective supporting structure.

In some embodiments, a height H of the reflective supporting structure is within a range of 2 to 7 mm.

In some embodiments, the reflective supporting structure is made of a white reflective material, and a reflectivity of the reflective supporting structure is greater than 90%.

In some embodiments, the predetermined angle is within a range of 5° to 15°.

In some embodiments, a material of each of the plurality of lens structures includes at least one of optical glue or optical resin.

In some embodiments, the backlight module further includes: an optical film arranged on a side of the reflective supporting structure away from the substrate, wherein the reflective supporting structure supports the optical film so that the optical film is in a flat state.

In some embodiments, the backlight module further includes a back plate and a supporting frame, the back plate and the supporting frame enclose an accommodating space, the substrate, the plurality of light-emitting elements on the substrate, and the reflective supporting structure on the substrate are accommodated in the accommodation space, and the supporting frame is configured to support an edge of the optical film.

In some embodiments, the light-emitting element includes a Mini LED.

Some embodiments of the present disclosure provide a display device, including: the backlight module according to the embodiments described above; and a display panel arranged on the backlight module.

BRIEF DESCRIPTION OF THE DRAWINGS

By reading the detailed description of the non-limiting embodiments with reference to the drawings, other features, purposes and advantages of the present disclosure will become more apparent, in the drawings.

DETAILED DESCRIPTION OF EMBODIMENTS

The present disclosure will be further described in detail below with reference to the drawings and embodiments. It can be understood that the specific embodiments described here are only used to explain the present disclosure, but not to limit the present disclosure. In addition, it should be noted that, for ease of description, only portions related to the present disclosure are shown in the drawings.

It should be noted that the embodiments in the present disclosure and the features in the embodiments can be combined with each other if there is no conflict.

In addition, in the following detailed description, for the convenience of explanation, many specific details are set forth to provide a comprehensive understanding of the embodiments of the present disclosure. However, obviously, one or more embodiments can also be implemented without these specific details.

It should be understood that, although the terms first, second, etc. may be used herein to describe various elements, these elements should not be limited by these terms. These terms are only used to distinguish one element from another element. For example, without departing from the scope of the exemplary embodiments, a first element may be named as a second element, and similarly, the second element may be named as the first element. A term "and/or" as used herein includes any and all combinations of one or more of the related listed items.

It should be understood that when an element or layer is referred to as being "formed on" another element or layer, the element or layer can be directly or indirectly formed on the another element or layer. That is, for example, there may be an intermediate element or an intermediate layer. In contrast, when an element or layer is referred to as being "directly formed on" another element or layer, there are no intermediate elements or layers. Other terms used to describe the relationship between elements or layers should be interpreted in a similar manner (for example, "between" and "directly between", "adjacent" and "directly adjacent" and so on).

The terms used herein are only for the purpose of describing specific embodiments, and are not intended to limit the embodiments. As used herein, unless the context clearly dictates otherwise, the singular form is also intended to include the plural form. It will also be understood that when terms "containing" and/or "including" are used herein, it means that the described features, wholes, steps, operations, elements and/or components are present, but do not exclude the presence or addition of one or more other features, wholes, steps, operations, elements, components, and/or combinations thereof.

In the present disclosure, unless otherwise specified, expressions "located in a same layer" and "arranged in a same layer" generally mean that a first part and a second part can use a same material and can be formed by a same patterning process. Expressions "located in different layers" and "arranged in different layers" generally mean that a first part and a second part are formed by different patterning processes.

The Mini LED described in the present disclosure refers to a LED device with a chip size between 50 μm and 200 μm, and the chip size thereof is much less than that of a conventional LED device used for a backlight module. Compared with a conventional direct-lit LED device (generally, with a center spacing greater than 30 mm), a center spacing of the Mini LED may be reduced to be in a range of 0.3 mm to 10 mm, and thus it is possible to form a more dense array of light sources, achieving a dynamic backlight effect that is finer and closer to pixelation than before. Therefore, the brightness and contrast of the screen may be effectively improved, and display of a dark area may be controlled and light leakage may be avoided.

The present disclosure provides a backlight module, and the backlight module includes: a substrate; a plurality of light-emitting elements arranged in an array on the substrate; a reflective supporting structure arranged on the substrate, in which the reflective supporting structure has a plurality of openings corresponding to the plurality of light-emitting elements one-to-one, each of the plurality of light-emitting elements is accommodated in one of the plurality of openings, and the reflective supporting structure is used to reflect light emitted by the plurality of light-emitting elements so that after the light is reflected, an angle between an exit direction of the reflected light and a first direction perpendicular to the substrate is smaller than a predetermined angle.

In the present disclosure, the light-emitting element may be Mini LED, LED, etc. In the following embodiments, the Mini LED is used as the light-emitting element for explanation.

The backlight module provided in the present disclosure is a low-cost and high-brightness Mini LED backlight module, which is a direct-lit backlight module with a small light mixing distance. By providing a reflective supporting structure with a specific structure and a high reflectivity, on the one hand, an optical film of the backlight module is supported by the reflective supporting structure to maintain a flat state, such as a horizontal state, so as to avoid bending of the optical film due to gravity which may cause optical defects of the backlight module; on the other hand, the light emitted by the Mini LED is reflected by a sidewall of an opening of the reflective supporting structure, so that a whole light-emitting angle of the backlight module is reduced and a brightness for a central viewing angle is improved, thereby avoiding the use of an expensive prism sheet (also called brightness enhancement film) in the optical film, and improving the overall brightness of the backlight module while reducing production costs.

Figure 1:
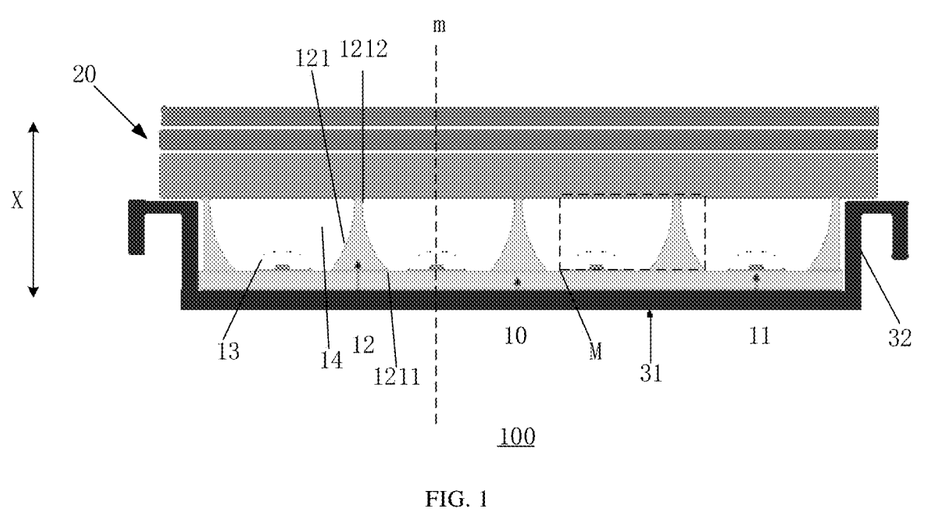
FIG. 1 is a schematic structural diagram of a backlight module provided by some embodiments of the disclosure.

FIG. 1 is a schematic structural diagram of a backlight module provided by some embodiments of the present disclosure. As shown in FIG. 1, the backlight module 100 includes a substrate 10 and a plurality of Mini LEDs 11 arranged in an array on the substrate 10. A reflective supporting structure 12 is further provided on the substrate 10, and the reflective supporting structure 12 is used to support an optical film 20 of the backlight module 100. The substrate 10 is further provided with a plurality of lens structures 13, and the plurality of lens structures 13 correspond to the plurality of Mini LEDs 11 one-to-one and cover the plurality of Mini LEDs 11 respectively. The lens structure 13 is used to guide light emitted by the Mini LED 11.

Figure 2:
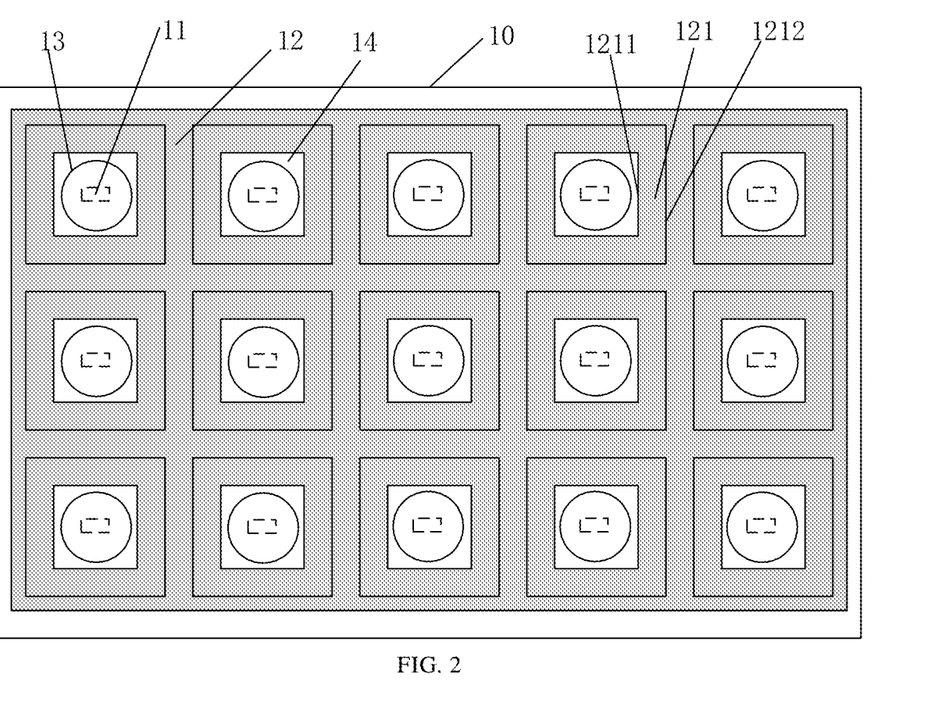
FIG. 2 is a schematic diagram of a plane structure of a light board of a backlight module provided by some embodiments of the present disclosure.

The substrate 10 and the Mini LED 11, the reflective supporting structure 12 and the lens structure 13 provided on the substrate 10 constitute a light board of the backlight module 100. FIG. 2 is a schematic diagram of a plane structure of a light board of a backlight module provided by some embodiments of the disclosure.

As shown in FIG. 1 and FIG. 2, the reflective supporting structure 12 is provided with a plurality of openings 14. Specifically, the plurality of openings 14 are through holes passing through the reflective supporting structure, and the plurality of openings 14 correspond to the plurality of Mini LEDs 11 one-to-one. Each of the plurality of Mini LEDs 11 and its corresponding lens structure 13 are accommodated in one of the openings 14. The reflective supporting structure 12 is made of a material with a high reflectivity, and a sidewall 121 of the opening 14 is used to reflect light emitted by a corresponding Mini LED, so that an angle between an exit direction of the reflected light and a first direction X perpendicular to the substrate 10 is smaller than a predetermined angle. As shown in FIG. 1, the first direction X is perpendicular to a light-emitting surface of the backlight module 100, and the first direction X may be regarded as a vertical light-emitting direction of the backlight module 100.

Each opening 14 includes at least one sidewall 121, for example, as shown in FIG. 2, each opening 14 includes four sidewalls 121 connected with each other. The sidewall 121 includes a first side 1211 parallel to the substrate 10 and a second side 1212 parallel to the substrate 10, and the first side 1211 and the second side 1212 are two opposite sides of each sidewall 121. The first side 1211 is closer to the substrate 10 relative to the second side 1212, that is, the second side 1212 is located on a side of the first side 1211 away from the substrate 10. As shown in FIG. 1, a bottom surface of the reflective supporting structure 12 at which the first side 1211 is located is directly arranged on the substrate 10, and a top surface of the reflective supporting structure 12 at which the second side 1212 is located is used to support the optical film 20 of the backlight module 100. The sidewall 121 is gradually far away from a first virtual line m from the first side 1211 toward the second side 1212, wherein the first virtual line m extends in the first direction X and passes through a corresponding Mini LED 11. An orthographic projection of the second side 1212 on the substrate 10 is located on a side of an orthographic projection of the first side 1211 on the substrate 10 away from the Mini LED 11. The sidewall 121 is a concave surface, for example, a concave arc surface. As a whole, an aperture of the opening 14 gradually increases from a side close to the substrate 10 toward a side away from the substrate 10.

In the embodiments, the reflective supporting structure 12 is used to support the optical film 20 of the backlight module 100, so that the optical film 20 is kept as flat as possible, for example, in a horizontal state, so as to avoid bending of the optical film 20 due to gravity which may cause optical defects of the backlight module 100. In addition, the light emitted by the Mini LED 11 is reflected by the sidewall 121 of the opening 14 of the reflective supporting structure 12, so that a whole light-emitting angle of the backlight module 100 is reduced and brightness is improved, thereby avoiding the use of an expensive prism sheet in the optical film.

In some embodiments, as shown in FIG. 2, the reflective supporting structure 12 is an integral structure, which may be directly formed on the substrate 10 by a patterning process including a coating process, a photolithography process, an etching process, and the like. In some embodiments, the reflective supporting structure 12 may also be directly formed on the substrate 10 by an injection or blow molding process, or the reflective supporting structure 12 may be formed and then bonded to the substrate 10.

The reflective supporting structure 12 is made of a white reflective material with a high reflectivity. For example, the reflective supporting structure 12 has a reflectivity of greater than 90%, such as 95%, for light in a band of 380 nm to 700 nm, so that most of the light incident on the sidewall 121 of the opening 14 of the reflective supporting structure 12 may be reflected out, thereby improving a luminous efficiency of the backlight module.

In some embodiments, the lens structure 13 is a convex lens used to guide the light emitted by the Mini LED 11, in order to guide as much light as possible to the sidewall 121 of the opening 14 of the reflective supporting structure 12 so that the light is reflected on the sidewall 121. The lens structure 13 may be made of optical glue or optical resin. For example, the lens structure 13 may be formed by spraying optical glue directly on the Mini LED 11.

In an ideal state, the lens structure 13 guides as much light emitted by the Mini LED 11 as possible to the sidewall 121 of the opening 14 of the reflective supporting structure 12. The light reflected by the sidewall 121 exits substantially in the first direction X perpendicular to the substrate 10. At this time, the light-emitting angle of the backlight module is reduced ideally, and an ideal brightness for the central viewing angle may be obtained. However, in an actual manufacturing process, the exit direction of the light reflected by the sidewall 121 is usually has an angle with respect to the first direction X, instead of being identical to the first direction X. For example, the light is reflected and exits in a direction having an offset towards the first virtual line m relative to the first direction X perpendicular to the substrate. As long as the above-mentioned angle is ensured to be less than the predetermined angle, the overall effect of reducing the light-emitting angle of the backlight module and increasing the brightness for the central viewing angle may be substantially achieved. The predetermined angle may be in a range of 5° to 15°, for example, the predetermined angle may be 10°.

Figure 3:
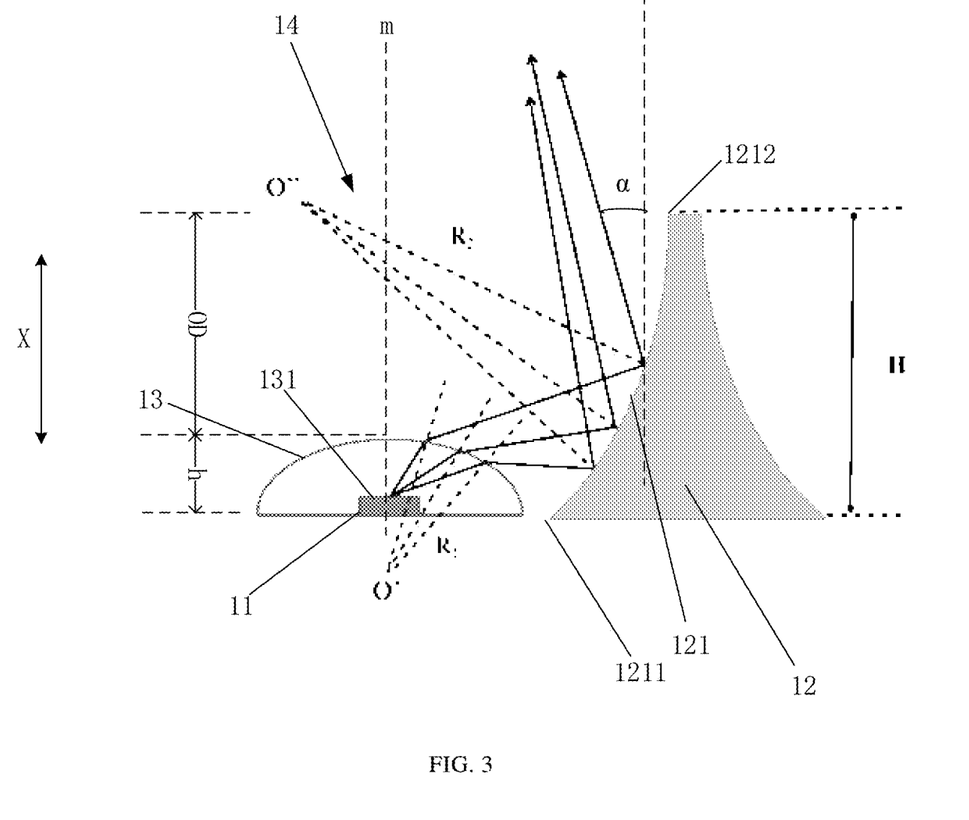
FIG. 3 is an enlarged schematic diagram of an area M in FIG. 1.

The specific structure of the reflective supporting structure 12 is described in detail below in conjunction with a light-emitting path of the light emitted by the Mini LED 11. FIG. 3 is an enlarged schematic diagram of an M area in FIG. 1, and FIG. 3 shows the light-propagation path of the light emitted by the Mini LED 11.

As shown in FIG. 3, most of the light emitted by the Mini LED 11 is guided by the lens structure 13 to be incident on the sidewall 121 of the opening 14 of the reflective supporting structure 12, and reflected by the sidewall 121, so that the reflected light exits in a direction having an offset toward the first virtual line m relative to the first direction X perpendicular to the substrate 10, wherein the angle α between the exit direction of the reflected light and the first direction is less than a predetermined angle. The predetermined angle may range from 5° to 15°, for example, the predetermined angle may be 10°. Therefore, the whole light-emitting angle of the backlight module 100 is reduced and the brightness for the central viewing angle is increased.

Although the reflected light reflected by the sidewall 121 shown in FIG. 3 exits in a direction having an offset toward the first virtual line m relative to the first direction X perpendicular to the substrate 10, it should be understood by those skilled in the art that the reflected light reflected by the sidewall 121 may exit in a direction having an offset away from the first virtual line m relative to the first direction X perpendicular to the substrate 10, as long as the angle α between the exit direction of the reflected light and the first direction is less than the predetermined angle in order to achieve a reduction of the light-emitting angle of the backlight module 100 and an increase of the brightness for the central viewing angle as a whole.

In some embodiments, as shown in FIG. 3, the lens structure 13 is used to guide the light emitted by the Mini LED 11. The lens structure 13 is a convex lens having a shape of spherical cap. A bottom surface of the spherical cap has a groove 131 for accommodating the Mini LED 11. The spherical gap may be understood as a part of a sphere that is cut by a plane. The lens structure 13 having this structure may guide as much light as possible to the sidewall 121 of the opening 14 of the reflective supporting structure 12.

In some embodiments, a radius R1 of the sphere to which the spherical cap belongs is in a range of 1 mm to 1.5 mm, for example, 1.25 mm, and a height h of the spherical cap is in a range of 0.4 mm to 0.7 mm, for example, 0.5 mm.

The lens structure 13 may be made of optical glue or optical resin. In some embodiments, the lens structure 13 may be formed by spraying optical glue directly on the Mini LED 11. In some embodiments, the lens structure 13 may also be made of optical resin material to form the above-mentioned structure, and then being disposed to cover the Mini LED 11.

In some embodiments, as shown in FIG. 3, the sidewall 121 of the opening 14 of the reflective supporting structure 12 is a concave surface, and the sidewall 121 is gradually far away from the first virtual line m from the first side 1211 to the second side 1212. The sidewall 121 is, for example, a concave arc surface.

In some embodiments, a radius of curvature R2 of the concave arc surface meets: $R2 = \alpha H$, where $\alpha$ is a constant value ranging from 1 to 1.5, such as being 1.25, H is a height of the reflective supporting structure ranging from 2 to 7 mm, such as being 5 mm.

As shown in FIG. 3, a distance between the lens structure 13 and the optical film 20 in the first direction X is referred to as an optical distance OD of the backlight module 100, and the optical distance OD is $OD = H - h$.

In some embodiments, as shown in FIG. 3, a top surface of the reflective supporting structure 12 at which the second side 1212 of the sidewall 121 is located may be a plane parallel to the substrate 10. With this design, the reflective supporting structure 12 may better support the optical film 20 to avoid scratching the optical film. In other embodiments, the top surface of the reflective supporting structure 12 at which the second side 1212 of the sidewall 121 is located may also be an arc surface which is slightly convex towards the optical film 20.

In some embodiments, as shown in FIG. 3, the first side 1211 of the sidewall 121 is separated from the lens structure 13 by a predetermined distance, depending on a certain tolerance in a manufacturing process. In an ideal state, the first side 1211 and the lens structure 13 are arranged in close proximity, and the lens structure 13 may guide as much light as possible to the sidewall 121 to reduce light loss as much as possible. However, in an actual design, considering the manufacturing process capability, in order to avoid poor assembly or poor optics by partial overlapping edges of the reflective supporting structure 12 and the lens structure 13 during the actual manufacturing process, the first side 1211 of the sidewall 121 and the lens structures 13 are designed to be separated by a predetermined distance.

The height H of the reflective supporting structure is one of the key factors that affect an overall thickness of the backlight module. If a value of the height H is too large, the overall thickness of the backlight module will become thicker, and eventually a thickness of the display device having the backlight module will increase, affecting the aesthetics. If the height H of the reflective supporting structure is too small, an area of the sidewall of the opening of the reflective supporting structure will be too small, affecting an overall luminous efficiency of the backlight module.

With the above-mentioned design, most of the light emitted by the Mini LED 11 may be guided by the lens structure 13 to be incident on the sidewall 121 of the opening 14 of the reflective supporting structure 12, and reflected by the sidewall 121, so that the reflected light exits in a direction having an offset toward the first virtual line m relative to the first direction X perpendicular to the substrate 10, and refracted light emitted from the lens structure 13 with a large angle is reflected by the sidewall 121 and enters the upper optical film 20 with a small angle, thereby improving an utilization rate of light. Therefore, the light-emitting angle of the backlight module 100 is reduced and the brightness for the central viewing angle is increased as a whole.

With the backlight module of this design, it is not necessary to use an expensive prism sheet, and a better light-emitting effect may be achieved just with a low-cost reflective supporting structure, improving the overall brightness of the backlight module while reducing the production cost. With the backlight module according to the embodiments of the present disclosure, the brightness may be increased by about 20% as compared with the backlight module using a double-prism optical film.

In some embodiments, continuing to refer to FIG. 1, the backlight module 100 further includes a back plate 31 and a supporting frame 32. The back plate 31 and the supporting frame 32 enclose an accommodating space, and the substrate 10 and the plurality of Mini LEDs 11, the lens structure 13 and the reflective supporting structure 12 on the substrate 10 are accommodated in the accommodating space. Specifically, the back plate 31 acts as a bottom wall of the accommodating space, the substrate 10 is disposed on the back plate 31, and the plurality of Mini LEDs 11, the lens structure 13, and the reflective supporting structure 12 are located on a side of the substrate 10 away from the back plate 31.

The supporting frame 32 acts as sidewalls of the accommodating space, and is used to form edges of the optical film 20 of the backlight module 100. Under the support of the supporting frame 32 and the reflective supporting structure 12, the optical film 20 of the backlight module 100 is substantially in a flat state, for example, in a horizontal state.

In some embodiments, the back plate 31 and the supporting frame 32 may be implemented as an integral structure, and the supporting frame 32 is formed by extending from edges of the back plate 31.

The optical film 20 of the backlight module 100 in the embodiments may include a diffuser, a retardation sheet, etc., and does not include an expensive prism sheet. A reduction in the number of optical films 20 is beneficial to reduce light loss and improve an utilization rate of light.

In some embodiments, the Mini LED 11 may be a Mini LED that emits white light or a Mini LED that emits blue light. When the Mini LED 11 is a Mini LED that emits blue light, the optical film 20 may include a quantum dot film.

The following analyzes optical characteristics of the backlight module in the embodiments of the present disclosure by comparing simulated optical effects between an embodiment of the present disclosure and comparative examples.

In a comparative example (Comparative Example 1), the backlight module is not provided with the above-mentioned reflective supporting structure, and an optical film of the backlight module does not include a prism sheet. In another comparative example (Comparative Example 2), the backlight module is not provided with the above-mentioned reflective supporting structure, and an optical film of the backlight module includes two prism sheets, see Table 1 for details.

TABLE 1

| Comparative Example 1 | Comparative Example 2 | Embodiment |
|---|---|---|
| No reflective supporting structure No prism sheet is included in optical film | No reflective supporting structure Optical film includes two prism sheets | Reflective supporting structure is provided No prism sheet is included in optical film |

Figure 4:
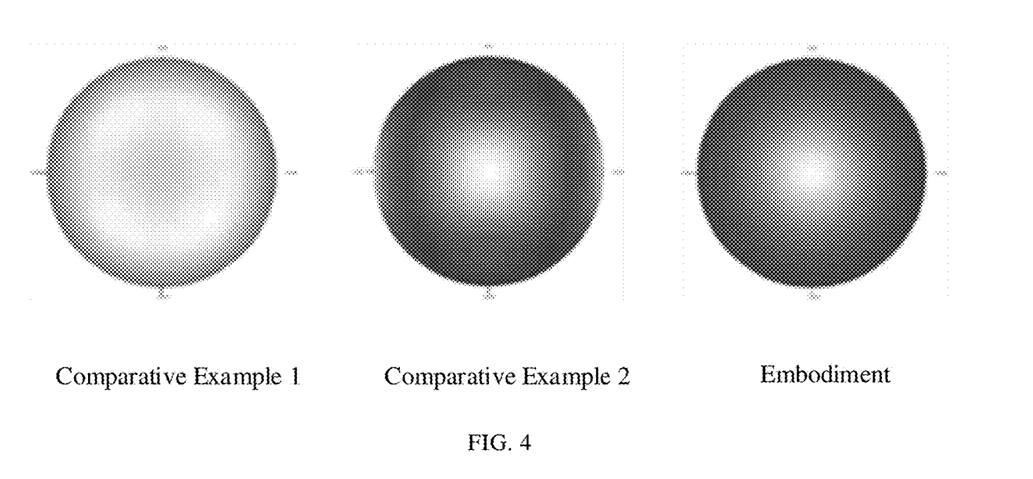
FIG. 4 shows simulation diagrams of brightness for a viewing angle of Comparative Example 1, Comparative Example 2, and an embodiment of the present disclosure.

FIG. 4 shows simulation diagrams of brightness for a viewing angle of an embodiment of the present disclosure and comparative examples. As shown in FIG. 4, by comparing simulation diagram of brightness for a viewing angle among Comparative Example 1, Comparative Example 2 and the embodiment of the present disclosure, it may be seen that the backlight module of Comparative Example 1 has the lowest brightness for the central viewing angle, and the light-emitting angle is near Lambertian type. The backlight module of Comparative Example 2 may reduce the light-emitting angle to a certain extent and increase the brightness for the central viewing angle, but there is a phenomenon of light leakage at a large viewing angle. The backlight module of the embodiment may also have the effect of reducing the light-emitting angle to a certain extent and increasing the brightness for the central viewing angle.

In the backlight module of Comparative Example 2, the light emitted by the Mini LED is substantially directly incident into the optical film, and the light transmitted through the optical film may cause transmission loss. The optical film includes two prism sheets, so that the number of optical films through which the light needs to pass is increased. In the backlight module of the embodiment of the present disclosure, most of the light emitted by the Mini LED is reflected by (the sidewall of the opening of) the reflective supporting structure with a high reflectivity. There is no need to provide a prism sheet in the optical film, and due to the high reflectivity of the reflective supporting structure, a luminous efficiency of the backlight module in the embodiment of the present disclosure is higher than that of the Comparative Example 2.

The following analyzes optical characteristics of the backlight module in the embodiment of the present disclosure by comparing simulated optical effects of the embodiment of the present disclosure and comparative examples. In this comparison, the backlight modules are all provided with a reflective supporting structure, and the optical film of the backlight module does not include a prism sheet, but a shape of a side surface of the opening of the reflective supporting structure is different.

Figure 5:
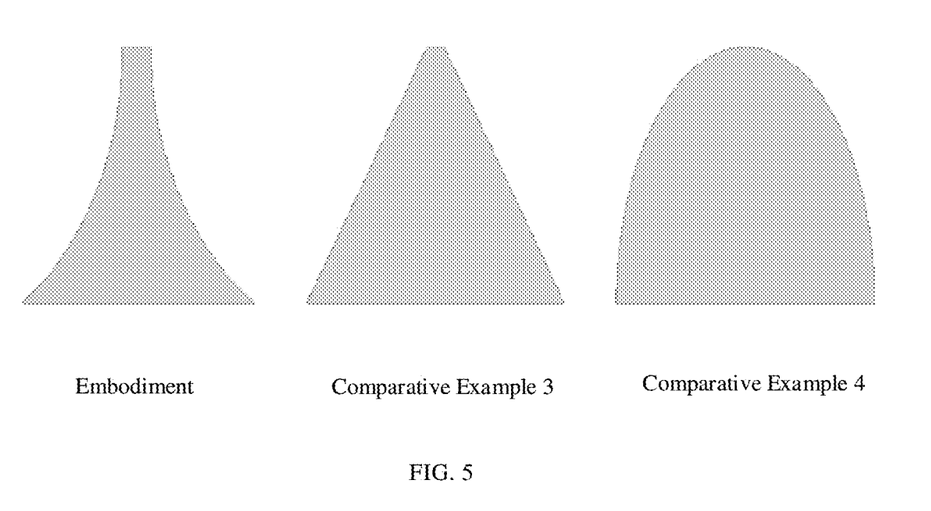
FIG. 5 shows schematic structural diagrams of a sidewall of an opening of a reflective supporting structure of an embodiment of the present disclosure, Comparative Example 3, and Comparative Example 4.

In the embodiment of the present disclosure, the sidewall of the opening of the reflective supporting structure of the backlight module is a concave surface as in the embodiments described above, see the leftmost figure in FIG. 5. In a comparative example (Comparative Example 3), the sidewall of the opening of the reflective supporting structure of the backlight module is a flat surface, see the middle figure in FIG. 5. In another comparative example (Comparative Example 4), the sidewall of the opening of the reflective supporting structure of the backlight module is a convex surface, see the rightmost figure in FIG. 5, and see Table 2 for details.

TABLE 2

| Embodiment | Comparative Example 3 | Comparative Example 4 |
|---|---|---|
| Reflective supporting structure is provided No prism sheet is included in optical film Sidewall of opening is concave surface | Reflective supporting structure is provided No prism sheet is included in optical film Sidewall of opening is flat surface | Reflective supporting structure is provided No prism sheet is included in optical film Sidewall of opening is convex surface |

Figure 6:
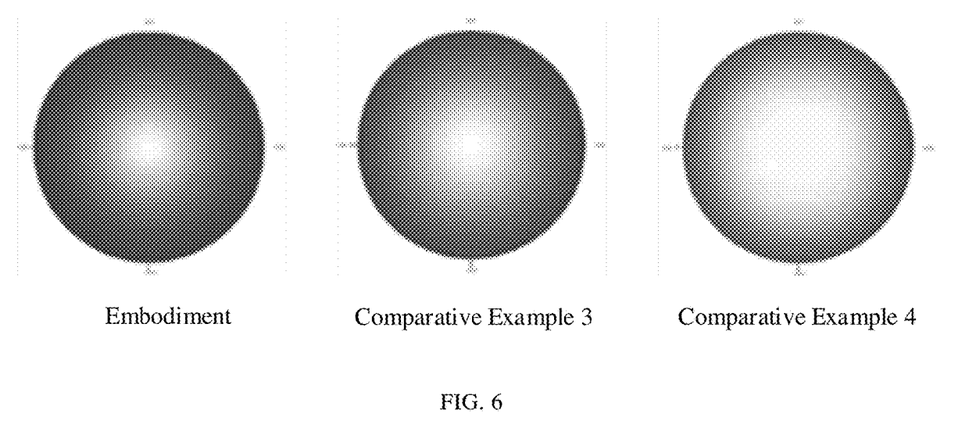
FIG. 6 shows simulation diagrams of brightness for a viewing angle of an embodiment of the present disclosure, Comparative Example 3, and Comparative Example 4.

FIG. 6 shows simulation diagrams of brightness for a viewing angle of an embodiment of the present disclosure and comparative examples. As shown in FIG. 6, by comparing simulation diagram of brightness for a viewing angle among Comparative Example 3, Comparative Example 4 and an embodiment of the present disclosure, it may be seen that the embodiment of the present disclosure, Comparative Example 3 and Comparative Example 4 with a reflective supporting structure may all reduce the light-emitting angle to a certain extent and increase the brightness for the central viewing angle. However, the backlight module in the embodiment of the present disclosure has the best effect of reducing the light-emitting angle and increasing the brightness for the central viewing angle.

Figure 7:
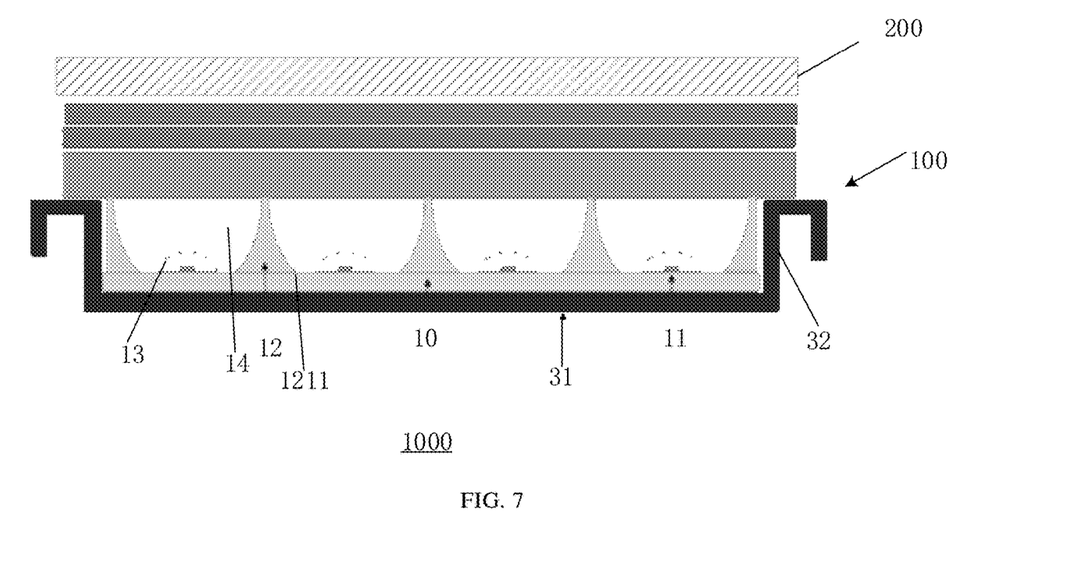
FIG. 7 is a schematic structural diagram of a display device provided by some embodiments of the present disclosure.

Some embodiments of the present disclosure further provide some display devices. As shown in FIG. 7, the display device 100 includes the backlight module 100 in the embodiments described above and a display panel 200 disposed on the backlight module. The display panel is, for example, a liquid crystal display panel. The display device may be any product or component with a display function, such as a TV, a monitor, a digital photo frame, a mobile phone, a smart watch, a tablet computer, and so on.

The above description is only preferred embodiments of the present disclosure and an explanation of the applied technical principles. Those skilled in the art should understand that the scope of the present disclosure involved in the present disclosure is not limited to the technical solutions formed by the specific combination of the above-mentioned technical features, and should also cover other technical solutions formed by any combination of the above-mentioned technical features and equivalent features thereof without departing from the inventive concept. For example, the above-mentioned features and the technical features disclosed in the present disclosure (but not limited to) with similar functions are mutually replaced to form a technical solution.

What is claimed is:

1. A backlight module, comprising:
    a substrate;
    a plurality of light-emitting elements arranged in an array on the substrate; and
    a reflective supporting structure on the substrate, wherein the reflective supporting structure has a plurality of openings, the plurality of openings correspond to the plurality of light-emitting elements one-to-one, and each of the plurality of light-emitting elements is accommodated in one of the plurality of openings,
    wherein the reflective supporting structure is configured to reflect light from the plurality of light-emitting elements, so that an angle between an exit direction of the reflected light and a first direction perpendicular to the substrate is less than a predetermined angle;
    wherein the backlight module further comprises: a plurality of lens structures covering the plurality of light-emitting elements respectively, wherein the plurality of lens structures correspond to the plurality of light-emitting elements one-to-one, and each of the plurality of lens structures is configured to cause light emitted by a corresponding light-emitting element to exit toward a sidewall of a corresponding opening; and wherein the sidewall is a concave arc surface, and a radius of curvature R2 of the concave arc surface is $R2=\alpha H$, wherein $\alpha$ is a constant value ranging from 1 to 1.5, and H is a height of the reflective supporting structure.

2. The backlight module according to claim 1, wherein each of the plurality of openings comprises at least one sidewall, and each of the at least one sidewall comprises a first side parallel to the substrate and a second side parallel to the substrate, wherein the second side is on a side of the first side away from the substrate, and an orthographic projection of the second side on the substrate is on a side of an orthographic projection of the first side on the substrate away from the light-emitting element.

3. The backlight module according to claim 2, wherein each of the plurality of openings comprises four sidewalls connected with each other, and each of the four sidewalls is a concave surface.

4. The backlight module according to claim 1, wherein each of the plurality of lens structures is a convex lens, and a bottom surface of the convex lens has a groove for accommodating the light-emitting element.

5. The backlight module according to claim 4, wherein the convex lens has a shape of a spherical cap, a height of the spherical cap is within a range of 0.4 mm to 0.7 mm, and a radius R1 of a sphere to which the spherical cap belongs is within a range of 1 mm to 1.5 mm.

6. The backlight module according to claim 1, wherein a height H of the reflective supporting structure is within a range of 2 to 7 mm.

7. The backlight module according to claim 1, wherein the reflective supporting structure is made of a white reflective material, and a reflectivity of the reflective supporting structure is greater than 90%.

8. The backlight module according to claim 1, wherein the predetermined angle is within a range of 5° to 15°.

9. The backlight module according to claim 1, wherein a material of each of the plurality of lens structures comprises at least one of optical glue or optical resin.

10. The backlight module according to claim 1, wherein the backlight module further comprises:

an optical film arranged on a side of the reflective supporting structure away from the substrate, wherein the reflective supporting structure supports the optical film so that the optical film is in a flat state.

11. The backlight module according to claim 10, wherein the backlight module further comprises a back plate and a supporting frame, the back plate and the supporting frame enclose an accommodating space, the substrate, the plurality of light-emitting elements on the substrate, and the reflective supporting structure on the substrate are accommodated in the accommodation space, and the supporting frame is configured to support an edge of the optical film.

12. The backlight module according to claim 1, wherein the light-emitting element comprises a Mini LED.

13. A display device, comprising:

the backlight module according to claim 1; and a display panel arranged on the backlight module.

14. The display device according to claim 13, wherein each of the plurality of openings comprises at least one sidewall, and each of the at least one sidewall comprises a first side parallel to the substrate and a second side parallel to the substrate, wherein the second side is on a side of the first side away from the substrate, and an orthographic projection of the second side on the substrate is on a side of an orthographic projection of the first side on the substrate away from the light-emitting element.

15. The display device according to claim 14, wherein each of the plurality of openings comprises four sidewalls connected with each other, and each of the four sidewalls is a concave surface.

* * * * *